(12) United States Patent
Wong

(10) Patent No.: US 8,644,513 B2
(45) Date of Patent: Feb. 4, 2014

(54) DATABASE PROCESSING ON EXTERNALLY ENCRYPTED DATA

(75) Inventor: Daniel ManHung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1319 days.

(21) Appl. No.: 12/122,597

(22) Filed: May 16, 2008

(65) Prior Publication Data

US 2009/0285396 A1 Nov. 19, 2009

(51) Int. Cl.
*G06F 21/00* (2013.01)

(52) U.S. Cl.
USPC .............................. 380/259; 380/256; 380/270

(58) Field of Classification Search
None
See application file for complete search history.

(56) References Cited

U.S. PATENT DOCUMENTS

| | | | | |
|---|---|---|---|---|
| 6,148,342 | A * | 11/2000 | Ho | 709/225 |
| 6,981,140 | B1 * | 12/2005 | Choo | 713/164 |
| 7,152,067 | B2 * | 12/2006 | Yagawa et al. | 713/151 |
| 7,266,699 | B2 * | 9/2007 | Newman et al. | 713/182 |
| 2002/0111920 | A1 * | 8/2002 | Tresser | 705/74 |
| 2002/0188871 | A1 * | 12/2002 | Noehring et al. | 713/201 |
| 2004/0255133 | A1 * | 12/2004 | Lei et al. | 713/193 |
| 2005/0257062 | A1 * | 11/2005 | Ignatius et al. | 713/176 |
| 2007/0061594 | A1 * | 3/2007 | Ginter et al. | 713/189 |
| 2008/0137848 | A1 * | 6/2008 | Kocher et al. | 380/201 |
| 2008/0168156 | A1 * | 7/2008 | Haff et al. | 709/219 |
| 2009/0037424 | A1 * | 2/2009 | Susairaj et al. | 707/10 |

OTHER PUBLICATIONS

Gligor, V.D.; Lindsay, B.G.;, "Object Migration and Authentication," Software Engineering, IEEE Transactions on , vol. SE-5, No. 6, pp. 607- 611, Nov. 1979.*
Oracle Corporation "Oracle Database Concepts 10g Release 2 (10.2)", Retrieved from the Internet: http://download.oracle.com/docs/cd/B19306_01/server.102/b14220.pdf , Retrieved Oct. 8, 2008, 1 page.
Oracle Corporation "Oracle Database Advanced Security Administrator's Guide 10g Release 2 (10.2) B14268-02", retrieved from internet: http://download.oracle.com/docs/cd/B19306_01/network.102/b14268.pdf , Retrieved on Oct. 8, 2008, 15 pages.

* cited by examiner

*Primary Examiner* — Peter Shaw
*Assistant Examiner* — Ali Shayanfar
(74) *Attorney, Agent, or Firm* — Hickman Palermo Truong Becker Bingham Wong LLP; Adam C. Stone

(57) ABSTRACT

Various techniques are described for processing externally encrypted data by database management system. Specifically, techniques are described for incorporating encrypted data stored in a first database that was encrypted by a first database management system into a second database where the encrypted data is accessed by a second database management system. When accessing externally encrypted data incorporated into the second database, the second database management system can decrypt portions of the data as needed. Because of the manner of incorporation of externally encrypted data into the second database, specifically because the externally encrypted data need not be decrypted before being incorporated into the second database, the computational overhead and security concerns associated with conventional approaches for migrating encrypted data from one database management system to another are avoided.

27 Claims, 4 Drawing Sheets

DATABASE PROCESSING ON EXTERNALLY ENCRYPTED DATA

FIELD OF THE INVENTION

The present invention relates to the field of processing database data, and more particularly to the field of processing externally encrypted data by a database management system.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
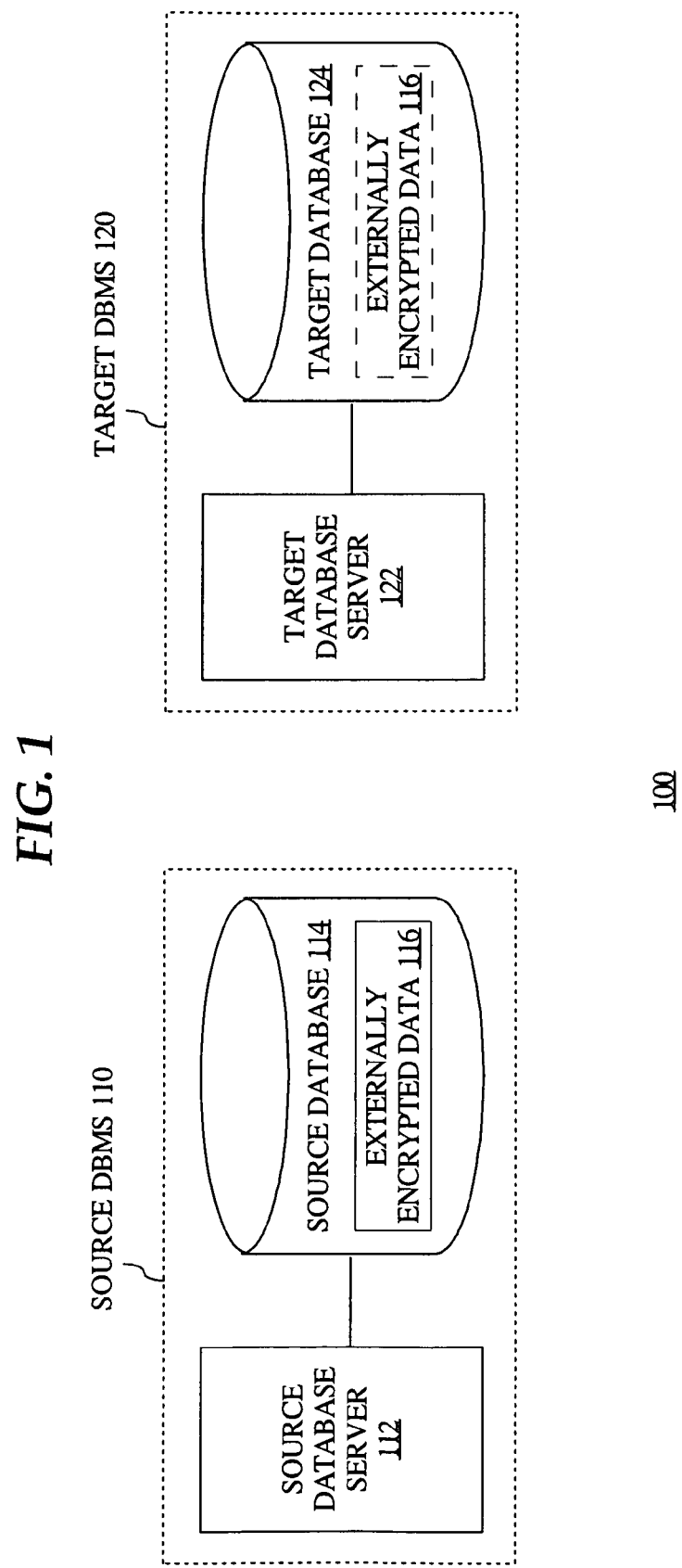
FIG. 1 is a block diagram of an exemplary operating environment in which an embodiment of the invention may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Introduction

Compliance with widely adopted security practices often requires storing sensitive data in databases in an encrypted form. The data may be encrypted using a variety of well-known encryption algorithms for encrypting data such as the Advanced Encryption Standard (AES) and the Data Encryption Standard (DES). To encrypt and decrypt data the encryption algorithm uses a cryptographic key. Database management systems (or customized extensions thereto) may employ encryption algorithms and cryptographic keys to encrypt and decrypt database data as the data is accessed by a database management system.

Because the encryption scheme and keys used to encrypt data are often specific to a particular instance of a database management system, users have difficulty migrating encrypted data from one database to another. Specifically, migrating encrypted data typically involves extracting and decrypting encrypted data from a source database and importing the unencrypted data into the target database wherein the data is then re-encrypted using the scheme and keys employed by the target database management system. This process of decrypting and re-encrypting can be prohibitively time and resource consuming especially for large sets of data. Further, security of the data is compromised by decrypting the data into its plaintext, or unencrypted format, which is readable by a human.

Functional Overview

Various techniques are described for processing externally encrypted data by a database management system. Specifically, techniques are described for processing externally encrypted data stored in a database by associating encryption parameters with one or more database objects. The encryption parameters specify a cryptographic key and a cryptographic cipher. As the externally encrypted data associated with the one or more database objects is accessed, the encryption parameters associated with the one or more database objects are used to decrypt the data. The computational overhead and security concerns associated with decrypting data before it is incorporated into a database are avoided because externally encrypted data may be decrypted as it is accessed.

Externally Encrypted Data

As used herein, "externally encrypted data" refers to database data that was encrypted by a first database management system that is to be accessed by a second database management system. For ease of explanation, the first database management system is referred to herein as the source database management system and the second database management system is referred to as the target database management system. With respect to the target database management system, externally encrypted data is encrypted by a database management system external to the target database management system (i.e., the source database management system). For the target database management system to access externally encrypted data in its un-encrypted form it is useful for the target database management system to understand certain properties of the externally encrypted data.

First, externally encrypted data may have been encrypted by the source database management system using a symmetric-key cipher. A symmetric-key cipher is a cryptographic algorithm that uses the same cryptographic key to encrypt data as it does to decrypt data. There are a variety of types of symmetric-key ciphers. However, a bulk cipher is typically used where large amounts of data are to be encrypted and decrypted such as by a database management system. A bulk cipher can either be a stream cipher or a block cipher. While there are numerous stream ciphers and block ciphers, typically only a handful of well-known algorithms are used. Rivest's Cipher 4 (RC4) is a commonly used stream cipher. Examples of commonly used block ciphers include Data Encryption Standard (DES), Tripe-Data Encryption Standard (3DES), and Advanced Encryption Standard (AES). Thus, to decrypt externally encrypted data it is necessary to know the symmetric-key cipher used to encrypt the externally encrypted data.

Second, to decrypt externally encrypted data it is also necessary to know the cryptographic key used to encrypt the data. A cryptographic key is a piece of information that is used by a symmetric-key cipher to transform plaintext into ciphertext when encrypting data and to transform ciphertext back to plaintext when decrypting data. Plaintext is information in its ordinary form for which there has been no action taken to conceal it. Plaintext is used as input to a symmetric-key cipher. Ciphertext is output from a symmetric-key cipher and is undecipherable by a human without the cryptographic key used to generate the ciphertext. To ensure security of encrypted data, the cryptographic key used to encrypt the data must remain a secret from those who are not authorized to view the encrypted data as plaintext. Accordingly, cryptographic keys used to encrypt data stored in a database are often generated by a trusted database administrator when installing a database management system.

Third, externally encrypted data may have been encoded prior to being encrypted. Thus, when ciphertext is decrypted into plaintext the plaintext must be decoded to reveal the un-encoded data. Additionally or alternatively, externally encrypted data may have been encoded after being encrypted. In this case, the ciphertext must first be decoded before it is decrypted into plaintext. The data may be encoded for a variety of reasons including for accounting reasons and/or to provide additionally security. For example, prior to encrypting a database value, the value may be "padded" with extra characters so that the length of the data being encrypted is an exact multiple of the block size of the cryptographic cipher used to encrypt the data. After decrypting a database value that has been padded, the extra characters must be removed to reveal the original value. Thus, in addition to knowledge of the symmetric-key cipher and cryptographic key used to encrypt externally encrypt data, it may also be necessary to understand how the data was encoded before and/or after encrypting the data.

Structural Overview

FIG. 1 is a block diagram of an exemplary operating environment 100 in which database processing on externally encrypted data may take place, according to an embodiment. Operating environment 100 includes a source database management system ("DBMS") 110 and a target DBMS 120.

DBMS 110 and 120 each comprise a database server and a database. Generally, a server, such as source database server 112 and target database server 122, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database, such as source database 144 and target database 124, comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting database language supported by many database servers is SQL, including proprietary forms of SQL supported by such database servers as Oracle, (e.g. Oracle Database 10g). SQL data definition language ("DDL") instructions are issued to a database server to create or configure database objects, such as tables, views, or complex types.

As embodiments of the invention shall be discussed wherein target DBMS 120 processes externally encrypted data 116 that was incorporated from source database 114 into target database 124, for ease of explanation, database 114 shall be referred to as the source database 114, and database 124 shall be referred to as the target database 124. Externally encrypted data 116 in target database 124 is depicted in a dotted line in FIG. 1 because, as the storage of externally encrypted data 116 in target database 124 is a result of incorporating externally encrypted data 116 from source database 114, externally encrypted data 116 in target database 124 may not have been instantiated (created) yet until after externally encrypted data 116 is incorporated from source database 114 into target database 124.

While each of the components discussed above is depicted separately in FIG. 1, one or more of the above functional components may be implemented on the same computer system. For example, source database server 112 and target server database 122 are implemented on the same machine in an embodiment.

Processing Externally Encrypted Data

Figure 2:
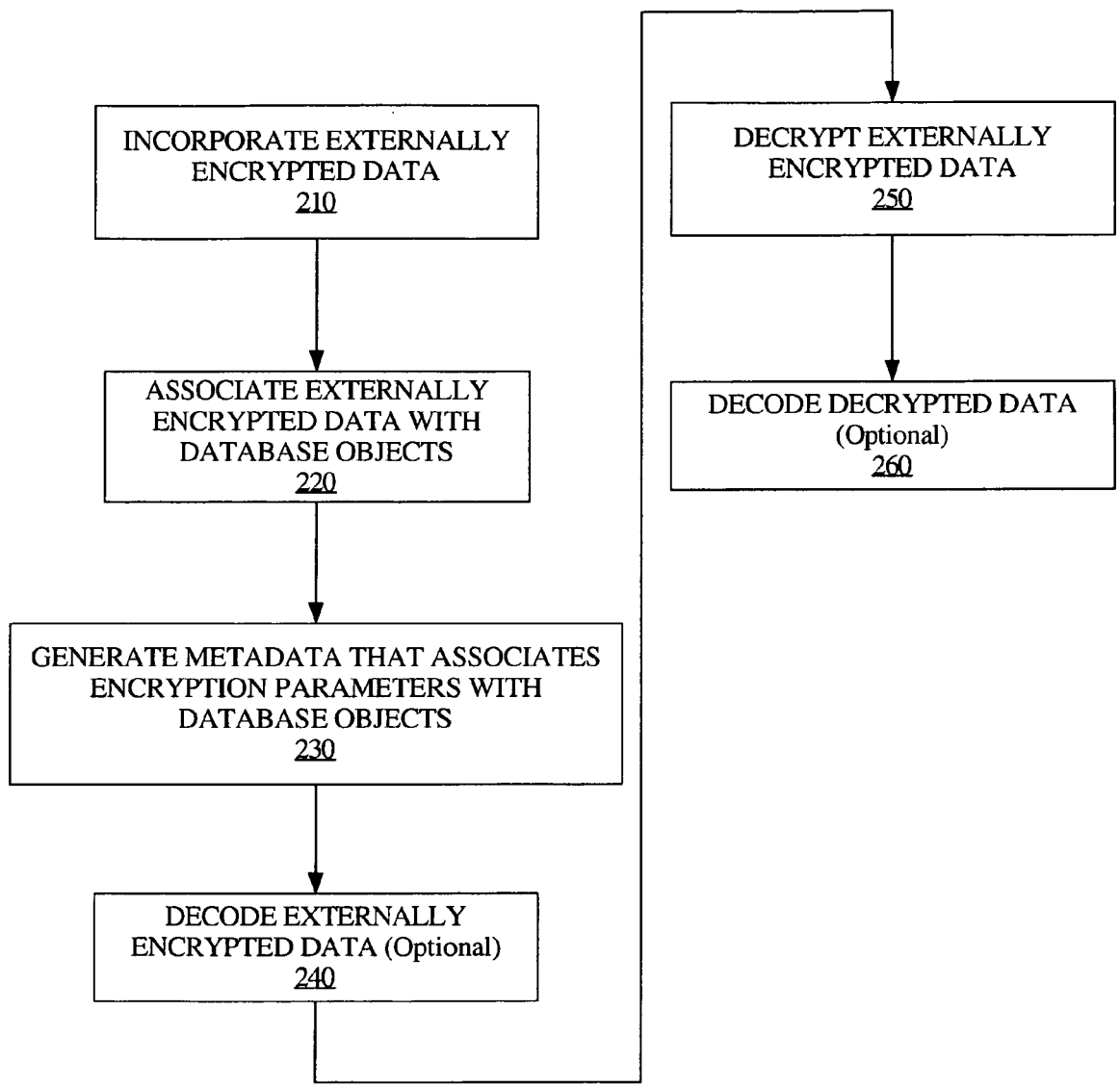
FIG. 2 is a flow diagram illustrating the steps of a method for processing externally encrypted data according to an embodiment of the invention.

The steps of processing externally encrypted data are described below with reference to FIG. 2, which is a flowchart illustrating the steps of processing externally encrypted data 116 stored in target database 124 by target DBMS 120 according to an embodiment. In an embodiment, some of the steps of FIG. 2 are performed by target database server 122 of target DBMS 120.

In step 210, externally encrypted data 116 is incorporated into target database 124. As used herein, "incorporating" data into a database refers to making the data accessible to users of a DBMS by storing the data in a database that is managed by the DBMS. Externally encrypted data 116 may be incorporated into target database 124 by various means available for incorporating data into a database. For example, externally encrypted data 116 may be incorporated into target database 124 by populating target database 124 with externally encrypted data 116 from source database 114 using utilities such as export/import and datadump. Significantly, externally encrypted data 116 may be incorporated into target database 124 in its encrypted form and need not be decrypted prior to being incorporated into target database 124.

In step 220, the incorporated externally encrypted data is associated with one or more database objects of target database 124. In general, a database object refers to any logical collection of database data that is defined by, described by, and organized according to database metadata, which may be stored in the database. The type of database objects employed by a database depends on the organizational scheme of the database. Non-limiting examples of database objects in a relational database include tables, rows, and columns, or any combination thereof. Non-limiting examples of database objects in an object-oriented database include object types or classes, objects, and attributes, or any combination thereof. Other database architectures may use other terminology.

Externally encrypted data may be associated with one or more database objects as a result of storing the externally encrypted data in target database 124. Typically, when data is stored in a database, metadata is created that associates the stored data with database objects. For example, when data is stored in a relational database table, metadata is created that associates the stored data with the table. When externally encrypted data is stored in target database 124, metadata may be created that associates the externally encrypted data with one or more database objects of target database 124.

In step 230, metadata is created in target database 124 that associates encryption parameters with one or more database objects of target database 124. In general, encryption parameters associated with a database object is information such as a cryptographic key that is used to decrypt and decode externally encrypted data associated with the database object.

In one embodiment, some or all of the encryption parameters that are associated with one or more database objects are received as input by the target DBMS and the metadata associating encryption parameters with database objects is generated in response to receiving the input. Encryption parameters may be received using virtually any means for receiving data. In one embodiment, a user supplies encryption parameters via a network accessible user-interface offered by target DBMS 120. Using the user-interface the user selects and/or creates one or more database objects and provides encryption parameters to associate with one or more of the selected and/or created database objects. In another embodiment, target DBMS 120 offers a programmatic interface by which a computing process can provide encryption parameters. Using the programmatic interface the computing process may provide encryption parameters to associate with one or more database objects. In one embodiment, a computing process is communicatively coupled to a programmatic interface of target DBMS 120 via a data network, and target DBMS 120 receives encryption parameters to associate with one or more database objects are target database 124 from the remote computing process over the network.

Although in FIG. 2, step 230 is illustrated as following steps 210 and 220, it is contemplated that metadata that associates encryption parameters with database objects may be generated before externally encrypted data is incorporated into the target DBMS. This may be desirable, for example, if a database administrator has configured the target database, such as target database 124, with database objects prior to importing or incorporating data into the target database. Therefore, the order of steps 210, 220 and 230 is not limited to the order depicted in FIG. 2 and it should be understood that step 230 may occur before steps 210 and 220.

Encryption parameters, database objects, and the associations between encryption parameters and database objects are described below with reference to FIG. 3.

Figure 3:
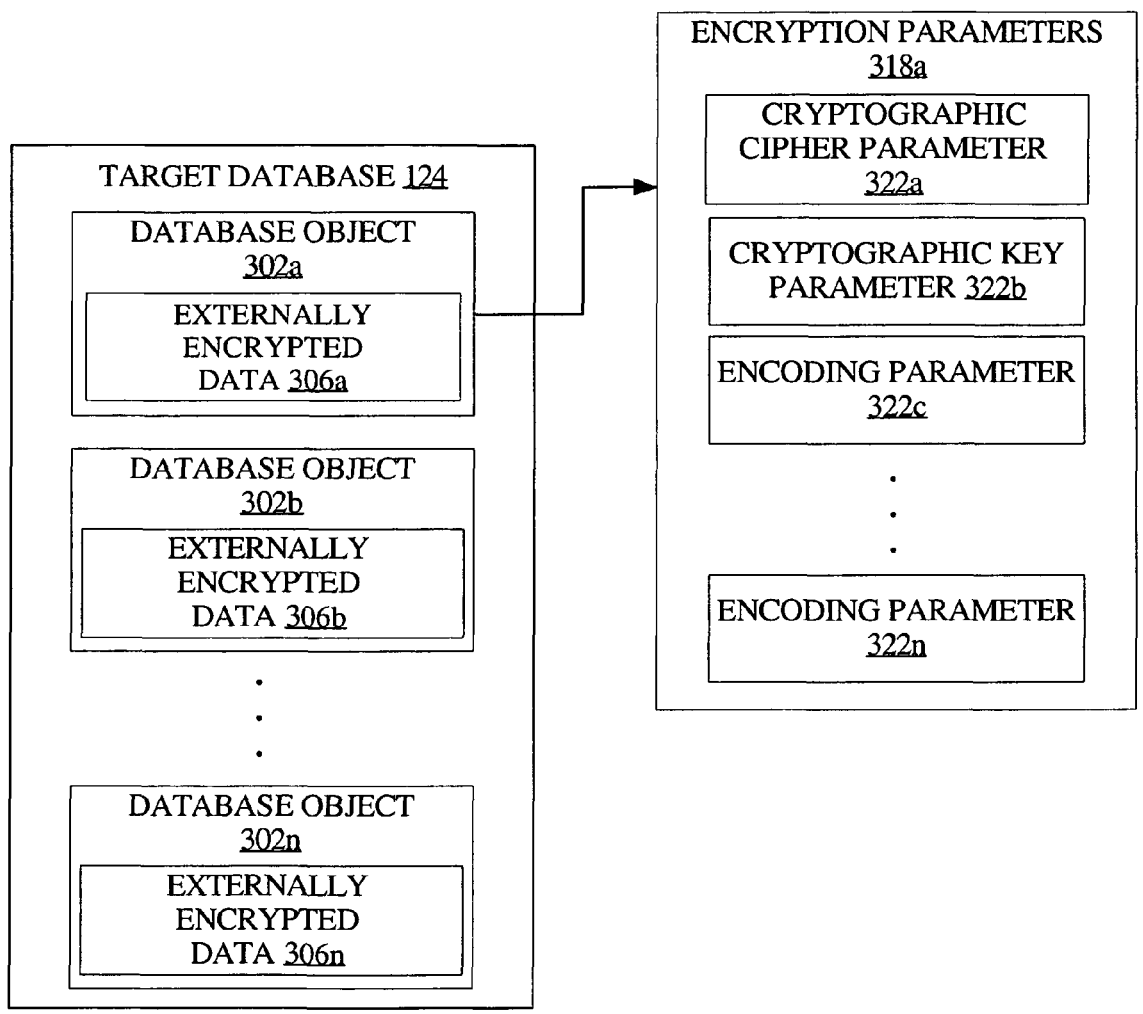
FIG. 3 is a block diagram that illustrates database objects and associated encryption parameters used by a database management system when processing externally encrypted data according to an embodiment of the invention.

FIG. 3 is a block diagram that illustrates target database 124 comprising database objects 302*a-n* that is defined metadata stored in target database 124. Database objects 302*a-n* logically contain, respectively, externally encrypted data 306*a-n*. Externally encrypted data 306*a-n* may comprise all or part of the externally encrypted data 116 incorporated into target database 124 in step 210.

A database object, such as database object 302*a*, may be associated with a set of encryption parameters, such as set of encryption parameters 318*a*. For example, FIG. 3 depicts database object 302*a* associated with set of encryption parameters 318*a*. A set of encryption parameters may be associated with more than one database object or a single database object.

Although FIG. 3 depicts database objects 302*a-n* containing externally encrypted data 306*a-n*, it is not necessary that every database object of a target database contain externally encrypted data. For example, if source database 114 is a relational database in which only one table contains encrypted data (e.g., the EMPLOYEE table) then database objects that are not associated with that table, such as database objects associated with other tables in target database 124, will not contain externally encrypted data.

Although FIG. 3 depicts database object 302*a* being associated with set of encryption parameters 318*a*, it is not necessary that a database object be associated with any encryption parameters. This may be desirable, for example, if the database object currently does not contain externally encrypted data. In contrast, it may be useful to associate encryption parameters with a database object that currently does not contain externally encrypted data if, for example, it is expected that encrypted data will be subsequently added to the database object. Thus, a database object that currently does not contain externally encrypted data may be associated with encryption parameters.

As discussed previously, a set of encryption parameters, such as set of encryption parameters 318*a* of FIG. 3, is information used by a target database to decrypt and decode externally encrypted data associated with a database object of the target database to which the set of the set of encryption parameters are associated. Set of encryption parameters 318*a* contains cryptographic cipher parameter 322*a*, cryptographic key parameter 322*b*, and encoding parameters 322*c-n*.

Cryptographic cipher parameter 322*a* is information that indicates the symmetric cryptographic cipher used to encrypt externally encrypted data 306*a* contained in database object 302*a*. For example, if source DBMS 110 employed the Triple-DES symmetric key cipher to encrypt externally encrypted data 306*a* then encryption parameter 322*a* would be information that indicates the Triple-DES symmetric key cipher. The form of the information used to indicate the symmetric cryptographic cipher may be in any form suitable for indicating the type of symmetric cryptographic cipher used to encrypt the externally encrypted data contained in the database object associated with the cryptographic cipher parameter. For example, cryptographic cipher parameter 322*a* may be a string such as "3DES" to indicate the Triple-DES cryptographic cipher or, alternatively, "AES" to indicate the Advanced Encryption Standard cipher.

Cryptographic key parameter 322*b* is information that indicates the cryptographic key used by the symmetric key cipher indicated by encryption parameter 322*a* to encrypt externally encrypted data 306*a*. The information that indicates the cryptographic key may be the bits of the cryptographic key itself or information that indicates how to retrieve the cryptographic keys from a remote key repository such as a Lightweight Directory Access Protocol (LDAP) server.

Optional encoding parameters 322*c-n* are one or more rules for encoding and decoding externally encrypted data 306*a* either before or after externally encrypted data 306*a* is decrypted in step 240. Encoding parameters are explained in greater detail below.

In optional step 240, externally encrypted data is decoded according to one or more encoding parameters before the externally encrypted data is decrypted. For example, prior to decrypting externally encrypted data 306*a* contained in database object 302*a*, externally encrypted data 306*a* may be decoded according to one or more encoding parameters 322*c-n* that were associated with database object 302*a* in step 230. Encoding parameters are explained in greater detail below.

In step 250, externally encrypted data is decrypted using the cryptographic cipher parameters and the cryptographic key parameters associated with the database objects that contain the externally encrypted data. For example, externally encrypted data 306*a* may be decrypted using cryptographic cipher parameter 322*a* and cryptographic key parameter 322*b* that were associated with database object 302*a* in step 230.

In optional step 260, externally encrypted data is decoded according to one or more encoding parameters after the externally encrypted data has been decrypted. For example, after decrypting externally encrypted data 306*a* contained in database object 302*a* into plaintext, the plaintext may be decoded according to one or more encoding parameters 322*c-n* that were associated with database object 302*a* in step 230. Encoding parameters are explained in greater detail below.

Encoding Parameters

Before externally encrypted data is decrypted to ciphertext and/or after externally encrypted data is decrypted to plaintext, one or mode encoding parameters associated with the database object containing the externally encrypted data may be applied. Encoding parameters may be applied to reverse an encoding applied by a source DBMS, such as source DBMS 110. Source DBMS 110 may encode data before and/or after encrypting data for a variety of reasons including for accounting purposes, to increase the security of encrypted data, and to place data in a format that is compatible with the cryptographic cipher used to encrypt the data.

Each encoding parameter, such as encoding parameters 322c associated with database object 302a, is associated with information that indicates an encoding rule and whether the rule is to be applied before encryption/decryption, after encryption/decryption, or both. Further, a set of encoding parameters, such as encoding parameters 322c-n, may be associated with information that indicates the order in which the rules associated with the set of encoding parameters are to be applied.

In one embodiment, an encoding rule associated with an encoding parameter is information or instructions that indicate how to transform data associated with the encoding parameter from one format to another. An encoding rule can be used to encode and decode data. Data may be encoded by applying the encoding rule to the data. The encoded data may be decoded by reversing the encoding applied to the data. For example, if an encoding rule specifies that the first four bytes of data are to indicate the time at which the data was last modified then the data can be encoded by pre-pending a four byte number to the sequence of bytes that comprise the data. The encoded data may then be decoded by removing the pre-pended four bytes to reveal the original un-encoded data.

In another embodiment, an encoding rule associated with an encoding parameter is information that indicates only how to decode data associated with the encoding parameter. In this case, the encoding rule is applied only once either before and/or after the externally encrypted data associated with the encoding parameter is decrypted.

Padding

One of the more common reasons for encoding data to be encrypted is to ensure that the length of the data is an exact multiple of the block size employed by the cryptographic cipher used to encrypt the data. This type of encoding is known in the art as "padding". Padding involves appending bytes to a sequence of bytes that are to be encrypted such that the resulting sequence of bytes is an exact multiple of the block size employed by the cryptographic cipher used to encrypt the data.

An encoding rule may specify how externally encrypted is padded such that after the externally encrypted data is decrypted the encoding rule may be applied to remove the padding that was added before the data was encrypted.

In one embodiment, an encoding rule associated with an encryption parameter indicates that the externally encrypted data was bit padded according to the method described in the standards document Request For Comments (RFC) 1312, the contents of which are hereby incorporated by reference. In general, bit padding operates by adding a single "1" bit to the data to be encrypted followed by as many "0" bits as necessary to bring the length of the data to an exact multiple of the block size of the cryptographic cipher. Bit padding may be reversed by removing the trailing "0" bits and the single "1" bit from the decrypted data.

In another embodiment, an encoding rule associated with an encryption parameter indicates that the externally encrypted data was byte padded according to one of the following well-known byte padding methods: ANSI X.923, ISO 10126, PCKS7, and zero-padding. Byte padding is similar to bit padding except that in byte padding, bytes are added to data to be encrypted to bring the length of the data to an exact multiple of the block size of the cryptographic cipher. Also similar to bit padding, data that has been byte padded may be reversed by removing the trailing bytes appended to the data. Each of the byte padding method listed above employs a different scheme for indicating how many bytes were added to the end of the data.

Decrypting Externally Encrypted Data on Access

In one embodiment, externally encrypted data is decrypted as the externally encrypted data is accessed by a target DBMS, such as target DBMS 120. Referring again to FIG. 2, and for the purposes of explanation, FIG. 1, a conventional mechanism for importing data into a database, such as a bulk database export/import tool, is used to incorporate externally encrypted data 116 stored in source database 114 into target database 24 as in step 210 of FIG. 2. Target DBMS 120 may then generate metadata as in step 230 of FIG. 2 that associates encryption parameters with one or more database objects of target database 124.

After externally encrypted data 116 is incorporated into target database 124 and encryption parameters are associated with database objects of target database 124, the externally encrypted data incorporated into target database 124 may be decrypted and decoded as it is accessed by users of target DBMS 120. For example, referring again to FIG. 3, externally encrypted data 306a may be decrypted and decoded by target DBMS 120 in response to target DBMS 120 receiving a database query for data associated with database object 302a. Thus, selected portions of externally encrypted data stored in target database 124 may be decrypted and decoded as needed and the computational cost of having to decrypt and decode all of externally encrypted data 116 as it is incorporated into target DBMS 120 is avoided.

Replication of Externally Encrypted Data

It may be desirable to operate a source DBMS after the externally encrypted data stored in the source database has been incorporated into a target DBMS. For example, a user may operate target DBMS 120 as a replica of source DBMS 110 to provide high-availability of data to other users. In this scenario, source DBMS 110 may receive updates to data stored in source database 114 after an initial incorporation of externally encrypted data 116 into target database 124. Upon receiving those updates, source DBMS 110 may encrypt and encode the received data according to the encryption and encoding scheme employed by source DBMS 110. To keep the data in source database 114 and target database 124 in sync, a replication mechanism may be employed to send updates to target DBMS 120 as they are made to source database 114.

In an embodiment, externally encrypted data that has been replicated from a source DBMS to a target DBMS is decrypted and decoded as the externally encrypted data is accessed by the target DBMS. For example, assume for the purposes of explanation that database object 302a of FIG. 3 is the EMPLOYEE table in target relational database 124. Database object 302a may contain externally encrypted data that was incorporated from the EMPLOYEE table of source database 114 at a point in time in the past. Further assume that database object 302a is associated with set of encryption parameters 318a that may be used to decrypt and decode externally encrypted data stored in the EMPLOYEE table of source database 114.

Upon source DBMS 110 receiving an update to the EMPLOYEE table of source database 114 (e.g., a SQL INSERT statement adding a new row to the EMPLOYEE table), source DBMS 110 may encrypt the data comprising the update according to an encryption scheme employed by source DBMS 110. Thereafter, the encrypted data comprising the new row may be replicated to target database 124 using virtually any means for replicating data between databases. Significantly, the data need not be decrypted before or as it is replicated from source database 114 to target database 124. However, if desired, the externally encrypted data may be decrypted and decoded as it is replicated according to the set of encryption parameters associated with the database object of the target database to which the externally encrypted data is associated.

Upon receiving the replicated data from source DBMS 110, target DBMS 120 may add the externally encrypted data to the EMPLOYEE table (i.e., database object 302a) of target database 124 without first decrypting and decoding the data. Once externally encrypted data has been incorporated into target database 124 through replication, the data may be decrypted and decoded on access as in the "Decrypting Externally Encrypted Data on Access" embodiment described above.

Because externally encrypted data replicated from source database 114 to target database 124 may be decrypted as it is accessed in target database 124, the computational overhead associated with decrypting data before or as it is replicated is avoided. Further, the replication mechanism used to keep source DBMS 110 and target DBMS 120 in sync with respect to database data not need to be configured to understand the encryption scheme employed by source DBMS 110. Thus, the replication mechanism does not require special logic to handle replication of externally encrypted data.

Decrypting Externally Encrypted Data on Import

In one embodiment, externally encrypted data is decrypted as the externally encrypted data is incorporated into a target database, such as target database 124. Referring again to FIG. 2, and for the purposes of explanation, FIG. 1, target DBMS 120 may generate metadata that associates encryption parameters with one or more database objects of target database 124 as in step 230 of FIG. 2. A conventional mechanism for importing data into a database, such as a bulk database export/import tool, is then used to incorporate externally encrypted data 116 stored in source database 114 into target database 124. On import, as externally encrypted data is added to a database object of target database 124 the data is decoded and decrypted according to the encryption parameters associated with the database object as in steps 240, 250, and 260 of FIG. 2.

In one embodiment, after externally encrypted data 116 has been decrypted and decoded on import it is stored in target database 124 in its unencrypted and un-encoded form. This may be desirable if externally encrypted data imported from a source database such as source database 114 is not be stored in an encrypted form in the target database.

In another embodiment, after externally encrypted data 116 has been decrypted and decoded on import the data is then re-encrypted and optionally re-encoded before being stored in target database 124 according to a set of encryption parameters different from the set of encryption parameters used to decrypt the externally encrypted data. This may be desirable if the target DBMS has been configured to use a different encryption scheme than the one employed by the source DBMS to encrypt the data after the data has been incorporated into the target DBMS.

Hardware Overview

Figure 4:
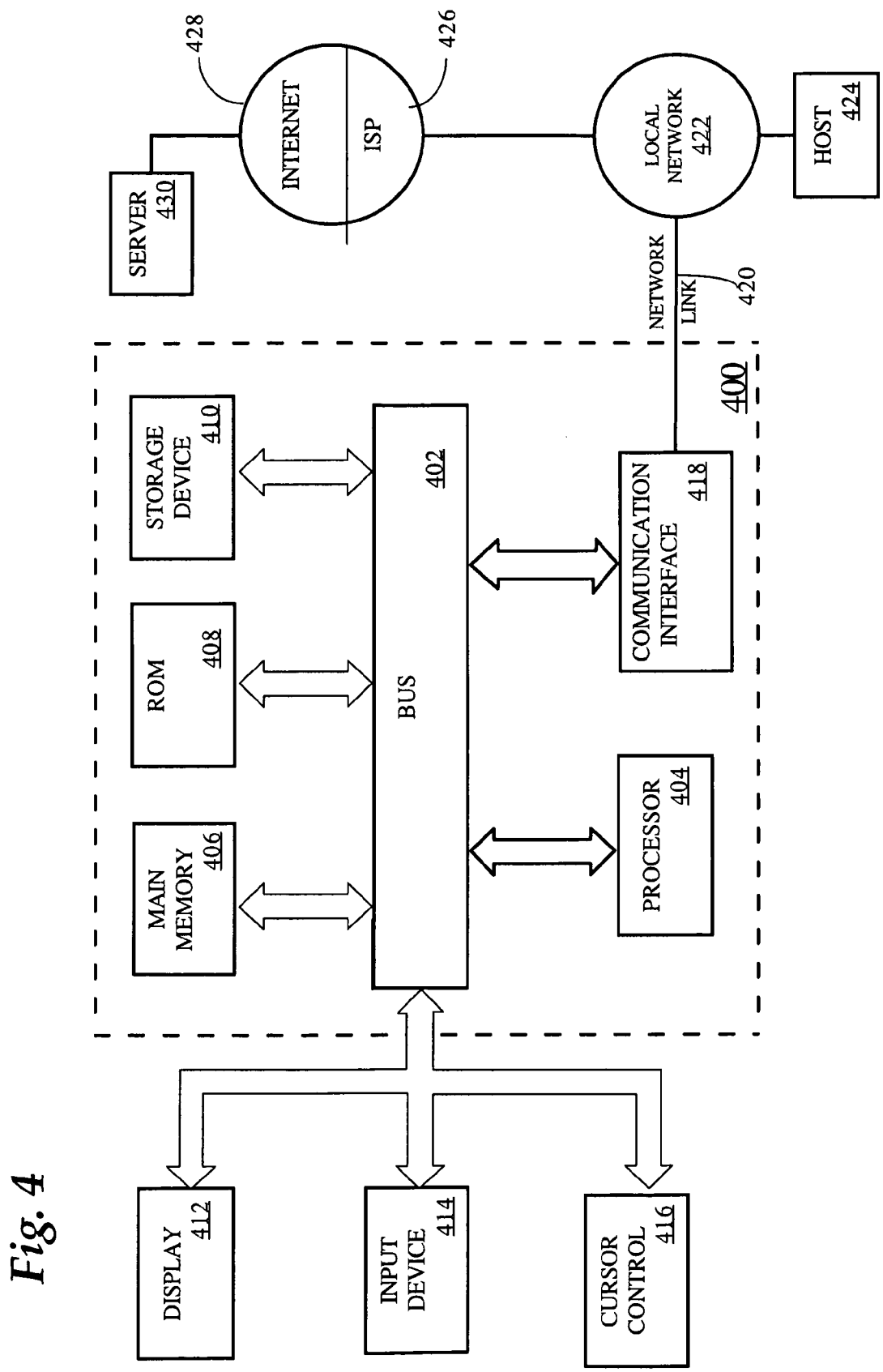
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. In a first database management system that manages a first database, a method comprising:
   responsive to receiving externally encrypted and encoded data, storing the externally encrypted and encoded data in a database object of the first database;
   wherein the received data that is externally encrypted and encoded is:
      (a) encoded by a second database management system before the encoded data is encrypted by the second database management system, or
      (b) both encoded by the second database management system before the encoded data is encrypted by the second database management system and encrypted by the second database management system before the encrypted data is encoded by the second database management system;
   wherein the second database management system is different from the first database management system;
   wherein the second database is different from the first database;
   responsive to receiving decryption and decoding information, storing the decryption and decoding information in the first database in association with the database object;
   responsive to receiving a database query requesting access to the data that is externally encrypted and encoded, decrypting and decoding the externally encrypted and encoded data using the decryption and decoding information, and returning the decrypted and decoded data as an answer to the query;
   wherein decrypting and decoding the externally encrypted and encoded data comprises:
      (a) using the decryption information to decrypt ciphertext data to produce plaintext data, and using the decoding information to decode the plaintext data, or
      (b) using first decoding information to decode ciphertext data to produce decoded ciphertext data, using the decryption information to decrypt the decoded ciphertext data to produce plaintext data, and using second decoding information to decode the plaintext data.

2. The method of claim 1, wherein the decoding information indicates whether the received data that is externally encrypted and encoded is (a) encoded by the second database management system before the encoded data is encrypted by the second database management system, or (b) both encoded by the second database management system before the encoded data is encrypted by the second database management system and encrypted by the second database management system before the encrypted data is encoded by the second database management system.

3. The method of claim 1:
   wherein the decoding information indicates that the received data that is externally encrypted and encoded is padded by the second database management system before the padded data is encrypted by the second database management system;
   wherein decrypting and decoding the externally encrypted and encoded data comprises using the decryption information to decrypt ciphertext data to produce plaintext data, and using the decoding information to removing padding from the plaintext data.

4. The method of claim 3:
   wherein the decoding information indicates that the received data that is externally encrypted and encoded is bit-padded by the second database management system before the bit-padded data is encrypted by the second database management system;

wherein decrypting and decoding the externally encrypted and encoded data comprises using the decryption information to decrypt ciphertext data to produce plaintext data, and using the decoding information to removing trailing bits from the plaintext data.

5. The method of claim 3:

wherein the decoding information indicates that the received data that is externally encrypted and encoded is byte-padded by the second database management system before the byte-padded data is encrypted by the second database management system;

wherein decrypting and decoding the externally encrypted and encoded data comprises using the decryption information to decrypt ciphertext data to produce plaintext data, and using the decoding information to removing trailing bytes from the plaintext data.

6. The method of claim 1:

wherein the decryption information comprises a cryptographic key and an indication of a cryptographic cipher;

wherein decrypting and decoding the externally encrypted and encoded data comprises decrypting ciphertext using the cryptographic key and the cryptographic cipher to produce plaintext data, and using the decoding information to decode the plaintext data.

7. The method of claim 1, wherein the externally encrypted and encoded data is received by the first database management system as part of a replication process configured to replicate database between the first database and the second database.

8. The method of claim 1, wherein the externally encrypted and encoded data is received by the first database management system as part of a bulk importation of at least a portion of the second database into the first database.

9. The method of claim 8, wherein the database query is received by the first database management system after the bulk importation of the portion of the second database into the first database is complete.

10. One or more non-transitory computer-readable media storing instructions which, when executed by one or more processors of a first database management system that manages a first database, causes performance of a method comprising:

responsive to receiving externally encrypted and encoded data, storing the externally encrypted and encoded data in a database object of the first database;

wherein the received data that is externally encrypted and encoded is:

(a) encoded by a second database management system before the encoded data is encrypted by the second database management system, or (b) both encoded by the second database management system before the encoded data is encrypted by the second database management system and encrypted by the second database management system before the encrypted data is encoded by the second database management system;

wherein the second database management system is different from the first database management system;

wherein the second database is different from the first database;

responsive to receiving decryption and decoding information, storing the decryption and decoding information in the first database in association with the database object;

responsive to receiving a database query requesting access to the data that is externally encrypted and encoded, decrypting and decoding the externally encrypted and encoded data using the decryption and decoding information, and returning the decrypted and decoded data as an answer to the query;

wherein decrypting and decoding the externally encrypted and encoded data comprises:

(a) using the decryption information to decrypt ciphertext data to produce plaintext data, and using the decoding information to decode the plaintext data, or (b) using first decoding information to decode ciphertext data to produce decoded ciphertext data, using the decryption information to decrypt the decoded ciphertext data to produce plaintext data, and using second decoding information to decode the plaintext data.

11. The one or more non-transitory computer-readable media of claim 10, wherein the decoding information indicates whether the received data that is externally encrypted and encoded is (a) encoded by the second database management system before the encoded data is encrypted by the second database management system, or (b) both encoded by the second database management system before the encoded data is encrypted by the second database management system and encrypted by the second database management system before the encrypted data is encoded by the second database management system.

12. The one or more non-transitory computer-readable media of claim 10:

wherein the decoding information indicates that the received data that is externally encrypted and encoded is padded by the second database management system before the padded data is encrypted by the second database management system;

wherein decrypting and decoding the externally encrypted and encoded data comprises using the decryption information to decrypt ciphertext data to produce plaintext data, and using the decoding information to removing padding from the plaintext data.

13. The one or more non-transitory computer-readable media of claim 12:

wherein the decoding information indicates that the received data that is externally encrypted and encoded is bit-padded by the second database management system before the bit-padded data is encrypted by the second database management system;

wherein decrypting and decoding the externally encrypted and encoded data comprises using the decryption information to decrypt ciphertext data to produce plaintext data, and using the decoding information to removing trailing bits from the plaintext data.

14. The one or more non-transitory computer-readable media of claim 12:

wherein the decoding information indicates that the received data that is externally encrypted and encoded is byte-padded by the second database management system before the byte-padded data is encrypted by the second database management system;

wherein decrypting and decoding the externally encrypted and encoded data comprises using the decryption information to decrypt ciphertext data to produce plaintext data, and using the decoding information to removing trailing bytes from the plaintext data.

15. The one or more non-transitory computer-readable media of claim 10:

wherein the decryption information comprises a cryptographic key and an indication of a cryptographic cipher;

wherein decrypting and decoding the externally encrypted and encoded data comprises decrypting ciphertext using the cryptographic key and the cryptographic cipher to produce plaintext data, and using the decoding information to decode the plaintext data.

16. The one or more non-transitory computer-readable media of claim 10, wherein the externally encrypted and encoded data is received by the first database management system as part of a replication process configured to replicate database between the first database and the second database.

17. The one or more non-transitory computer-readable media of claim 10, wherein the externally encrypted and encoded data is received by the first database management system as part of a bulk importation of at least a portion of the second database into the first database.

18. The one or more non-transitory computer-readable media of claim 17, wherein the database query is received by the first database management system after the bulk importation of the portion of the second database into the first database is complete.

19. One or more computing devices comprising:
one or more processors;
memory;
one or more programs, wherein the one or more programs are stored in the memory and configured to be executed by the one or more processors, the one or more programs including instructions for:
responsive to receiving externally encrypted and encoded data, storing the externally encrypted and encoded data in a database object of the first database;
wherein the received data that is externally encrypted and encoded is:
  (a) encoded by a second database management system before the encoded data is encrypted by the second database management system, or
  (b) both encoded by the second database management system before the encoded data is encrypted by the second database management system and encrypted by the second database management system before the encrypted data is encoded by the second database management system;
wherein the second database management system is different from the first database management system;
wherein the second database is different from the first database;
responsive to receiving decryption and decoding information, storing the decryption and decoding information in the first database in association with the database object;
responsive to receiving a database query requesting access to the data that is externally encrypted and encoded, decrypting and decoding the externally encrypted and encoded data using the decryption and decoding information, and returning the decrypted and decoded data as an answer to the query;
wherein decrypting and decoding the externally encrypted and encoded data comprises:
  (a) using the decryption information to decrypt ciphertext data to produce plaintext data, and using the decoding information to decode the plaintext data, or
  (b) using first decoding information to decode ciphertext data to produce decoded ciphertext data, using the decryption information to decrypt the decoded ciphertext data to produce plaintext data, and using second decoding information to decode the plaintext data.

20. The one or more computing devices of claim 19, wherein the decoding information indicates whether the received data that is externally encrypted and encoded is (a) encoded by the second database management system before the encoded data is encrypted by the second database management system, or (b) both encoded by the second database management system before the encoded data is encrypted by the second database management system and encrypted by the second database management system before the encrypted data is encoded by the second database management system.

21. The one or more computing devices of claim 19:
wherein the decoding information indicates that the received data that is externally encrypted and encoded is padded by the second database management system before the padded data is encrypted by the second database management system;
wherein decrypting and decoding the externally encrypted and encoded data comprises using the decryption information to decrypt ciphertext data to produce plaintext data, and using the decoding information to removing padding from the plaintext data.

22. The one or more computing devices of claim 21:
wherein the decoding information indicates that the received data that is externally encrypted and encoded is bit-padded by the second database management system before the bit-padded data is encrypted by the second database management system;
wherein decrypting and decoding the externally encrypted and encoded data comprises using the decryption information to decrypt ciphertext data to produce plaintext data, and using the decoding information to removing trailing bits from the plaintext data.

23. The one or more computing devices of claim 21:
wherein the decoding information indicates that the received data that is externally encrypted and encoded is byte-padded by the second database management system before the byte-padded data is encrypted by the second database management system;
wherein decrypting and decoding the externally encrypted and encoded data comprises using the decryption information to decrypt ciphertext data to produce plaintext data, and using the decoding information to removing trailing bytes from the plaintext data.

24. The one or more computing devices of claim 19:
wherein the decryption information comprises a cryptographic key and an indication of a cryptographic cipher;
wherein decrypting and decoding the externally encrypted and encoded data comprises decrypting ciphertext using the cryptographic key and the cryptographic cipher to produce plaintext data, and using the decoding information to decode the plaintext data.

25. The one or more computing devices of claim 19, wherein the externally encrypted and encoded data is received by the first database management system as part of a replication process configured to replicate database between the first database and the second database.

26. The one or more computing devices of claim 19, wherein the externally encrypted and encoded data is received by the first database management system as part of a bulk importation of at least a portion of the second database into the first database.

27. The one or more computing devices of claim 26, wherein the database query is received by the first database management system after the bulk importation of the portion of the second database into the first database is complete.

* * * * *

UNITED STATES PATENT AND TRADEMARK OFFICE
CERTIFICATE OF CORRECTION

PATENT NO. : 8,644,513 B2 Page 1 of 1
APPLICATION NO. : 12/122597
DATED : February 4, 2014
INVENTOR(S) : Wong It is certified that error appears in the above-identified patent and that said Letters Patent is hereby corrected as shown below:

In the Specification

In column 2, line 44, delete "Tripe-" and insert -- Triple- --, therefor.

Signed and Sealed this
Twenty-fourth Day of June, 2014

Michelle K. Lee
*Deputy Director of the United States Patent and Trademark Office*